United States Patent [19]
Sikand et al.

[11] Patent Number: 5,025,468
[45] Date of Patent: Jun. 18, 1991

[54] COMPUTERIZED SYSTEM FOR INCOMING CALLS

[75] Inventors: Parminder S. Sikand, Richmond; Mary J. McAllister, San Anselmo; John Henel, Richmond; Allen L. Jackson, Penngrove; Karen Bell, Rohnert Park, all of Calif.

[73] Assignee: Harris Corporation, Melbourne, Fla.

[21] Appl. No.: 347,531

[22] Filed: May 4, 1989

[51] Int. Cl.$^5$ .......................................... H04Q 3/64
[52] U.S. Cl. ..................................... 379/67; 379/266; 379/309
[58] Field of Search ............... 379/266, 265, 309, 113, 379/214, 88, 67, 89

[56] References Cited

U.S. PATENT DOCUMENTS

| | | | |
|---|---|---|---|
| 4,048,452 | 9/1977 | Oehring et al. | 379/266 X |
| 4,197,430 | 4/1980 | Dowden | 379/266 |
| 4,451,705 | 5/1984 | Burke et al. | 379/266 X |
| 4,497,979 | 2/1985 | Phelan | 379/266 X |
| 4,757,529 | 7/1988 | Glapa et al. | 379/266 X |
| 4,788,715 | 11/1988 | Lee | 379/266 X |
| 4,788,718 | 11/1988 | McNabb et al. | 379/113 |

Primary Examiner—James L. Dwyer
Attorney, Agent, or Firm—Joel I. Rosenblatt

[57] ABSTRACT

In a telephone automatic call distribution system (ACD), incoming telephone calls are assigned to a queue. Additionally, announcements are peridically provided to the incoming callers usually notifying the caller the system is processing the call and the manner of such processing. The number of agents available to handle calls is controlled by a load factor expressed as a ratio of incoming calls in the queue to number of agents available. This load factor is used as a threshold level, which when exceeded, causes the system to add an additional agent or additional groups of agents, increasing the probability the calls longest in the queue will be answered. The oldest call or the call that was first in and not yet answered is passed along to the next available agent group added to the system. Additionally, to insure the timing of the periodic announcements is consistent, the announcement system is kept separate from the call distribution system so any changes in the call agent group assignment will not effect the frequency of the announcements. When the load factor is exceeded the caller is shifted to another entry level having a lower load factor and a higher probability that an agent will answer.

39 Claims, 4 Drawing Sheets

COMPUTERIZED SYSTEM FOR INCOMING CALLS

FIELD OF INVENTION

This invention relates to computerized telephone systems and automatic call distribution systems within those telephone systems for routing a number of incoming calls to a plurality of agents.

BACKGROUND

Automatic Call Distribution Systems (ACD) are well known for that reason are not described in detail. Such ACD is described generally in U.S. Pat. No. 4,788,718 and the references cited therein. Its basic function is to handle a number of callers greater in number than the number of available agents, at any one particular time. The ACD puts callers on hold and then, according to procedures designed into the system, connects the caller to the next available agent. Primitive systems use a simple queue where the first caller in is connected to the next available agent. Other systems use a pool of agents, some actively engaged in answering calls, others being held in reserve and being brought in when the number of callers on hold exceed a time dependent criteria. Each of these systems has as a disadvantage, an inability to control allocation of agents, by the population of callers at any one particular time. Previously, agent resources were allocated by entry order in a queue, or time in a queue, but not by population in the queue relative to active agents.

Further, the prior art was incapable of maintaining consistent intervals between announcements as the calling party was moved through various levels in the ACD. Announcements, usually given to notify the caller of its call status and reassure the caller on a periodic basis, depended upon the caller's call place in the ACD. As the call was shifted through the ACD, the announcement, coupled with each individual ACD level was played to that caller. However, as the periodicity of the announcement at each ACD level was unrelated to or dependent upon the periodicity for any other ACD level, a change occurring between announcements, altered the period between announcement occurring before and after such change. In this way, moving the call through various ACD levels disrupted the timing consistency in the message announcement interval, and the quality of reassurance to the called party, often times discouraging the called party from remaining on the line to wait for the next available agent.

SUMMARY OF THE INVENTION

This invention improves the ACD by making the agents available for answering a call dependent upon the population of callers at any one particular time. This is accomplished though an Intelligent Queue (IQ) factor or load factor. The IQ factor relates the population of calls to the number of available agent groups and to respective available agents, currently handling calls. The IQ factor is not static but may change in relation to the call population or the number of active agents. The ACD can also be used with announcements to reassure the caller it is in, and being processed by, the ACD. In the event the ACD passes the call between agent groups or between different levels in the ACD system, for example, with different IQ factors, it maintains a consistent period or may vary the period between announcements to the caller. This is accomplished by keeping the Message Announcement System (MAS) separate from the Call Distribution System (CDS) and the caller connected to the message announcement system in parallel to the CDS. In this way, the caller is connected to the same message announcement system (MAS) independently of the manner in which the CDS system handles the caller. Further, the MAS can be adjusted in process without effecting the CDS pattern and vice versa.

Accordingly, what is shown is a method and a system controlling the waiting periods experienced by a caller in a Call Distribution System (CDS). According to the method and the system shown, a series of one or more patterns (which may refer to separate telephone numbers) may be established with each of the patterns having a series of entry levels. In the preferred embodiment of the time scanning multiplex switching system, the patterns correspond to separate telephone numbers, for example, such as 800 numbers. The caller is placed in the queue at a selected one of the entry levels with the respective pattern. In the preferred embodiment, the pattern is established by grouping of addresses of trunk ports which identify the callers and agent extension numbers which identify the number of active agents available to answer the callers. However, as would be apparent to one skilled in the art, this manner of identification may be varied depending upon the system used, the system shown being used with the time scan multiplex system used in the preferred embodiment. As one alternative, each port may have a flag or code indicating its pattern and entry level. Further, a load factor, expressed as an IQ factor, is established for each of the entry levels which is indicative of the probability of caller at a respective entry level will be connected to a respective agent. According to the inventive principals, the IQ or load factor is a ratio of the number of callers in the queue with any one entry level relative to the number of active agents. According to the inventive principles, this load factor, or its effect, may be changed interactively by changing the load factor or by adding or deleting agents at an entry level, thereby effecting the operation of the system through the load factor at any one respective entry level and the probability a caller will be connected to any agent. The load factor is then examined relative to the number of callers at an entry level and to the number of agents to determine whether the load factor at that entry level has been exceeded. In the preferred embodiment where that load factor is exceeded, the caller having the longest interval in that entry level is then passed to the next entry level in the pattern, the pattern being comprised of a series of entry levels. According to the preferred embodiment, each entry level in the progression of entry levels in the series contains a higher probability that a caller will be answered. This is accomplished by reducing the IQ or load factor in the direction of the progression. Further, according to the inventive principals, a message announcement system (MAS) is connected to each caller independently of the caller's position in the queue and its respective entry level at any one time in that pattern. The MAS periodically connects the caller to an announcement which is repeated with the same time period interval as the caller is shifted or passed to the various entry levels in the entry level series within any one pattern. While the message period can be changed interactively, in the preferred embodiment, the period is kept uniform so the caller hears the message at the same

DETAILED DESCRIPTION OF THE DRAWINGS

DETAILED DESCRIPTION OF THE INVENTION

Figure 1:
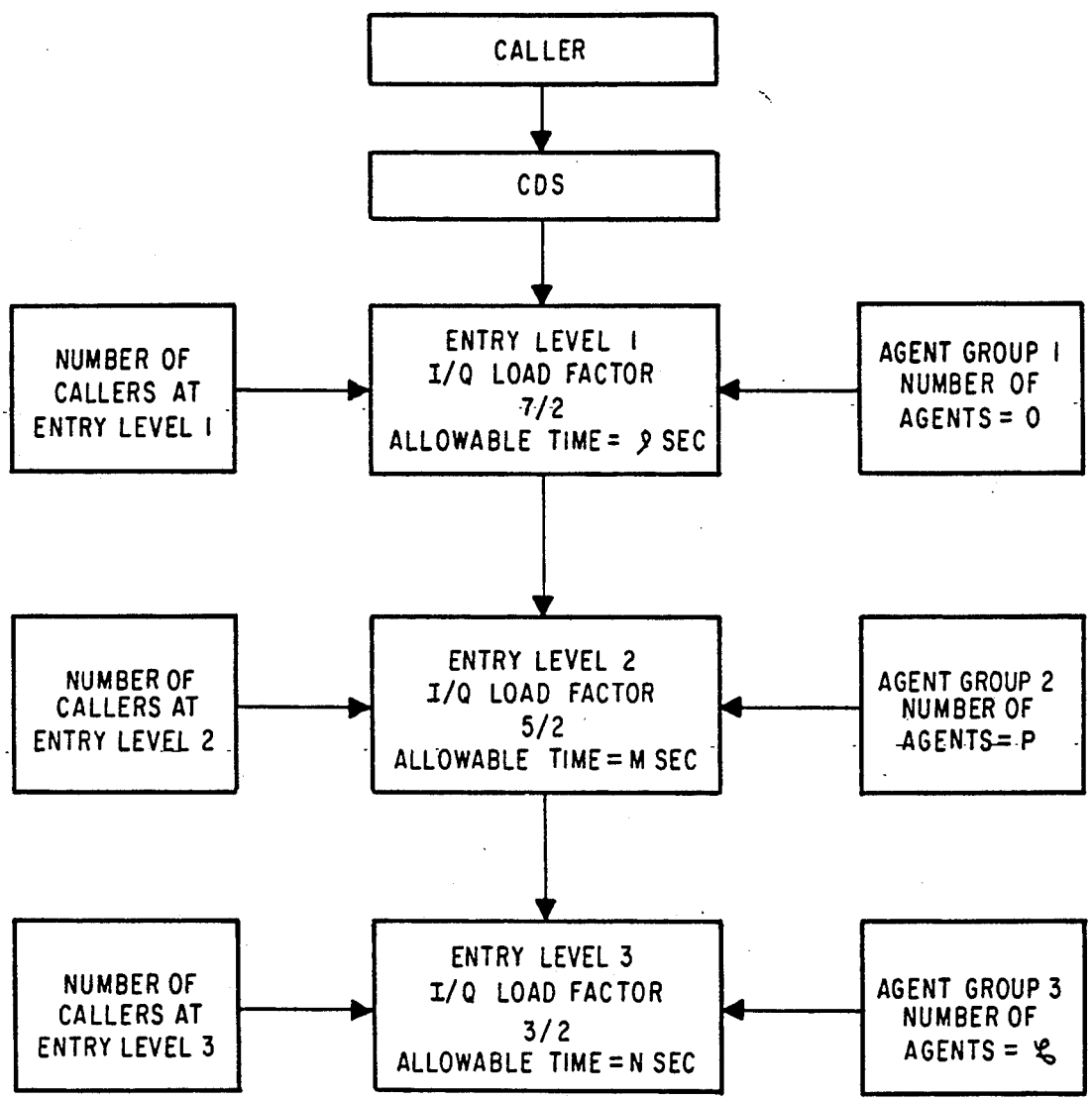
FIG. 1 shows a flow chart of a pattern containing a series of entry levels, with respective IQ or load factors at each entry level and with each entry level having a respective set of callers and agents.

The invention, according to its preferred embodiment, is used with a centralized image responsive telephone time slot interchange system, as shown in U.S. Pat. No. 4,688,212. However, it should be understood that the invention may be practiced with any other telephone system wherein multiple input calls may be connected to multiple destination locations, such as agents at extensions, and at one or more locations.

The telephone exchange, as shown in the above referenced patent is a time scan multiplexing system using a central processor to time scan a number of ports, such as for example, trunk ports, through which an incoming call may be connected. The central processor then, using the information received from the trunk port connects the trunk to an extension at an addresses destination port (also called an extension port) to complete the call. In the process, the transmission of information between the trunk port and the address port containing the extension is accomplished on a time multiplex schedule controlled from the centrally located processor. In the preferred embodiment, agents are identified by address or extension ports identifying the agents extension number. Respective CDS entry levels are established by respective groupings of selected agent extension numbers within a group of memory locations. The trunk ports connecting incoming callers would be assembled through the same addressing scheme, and placed in a respective entry level with the group of addresses containing the agent extensions at that respective entry level. Then, the ports would be scanned and either connected to an agent when available or held until an agent becomes available. The CPU then, by grouping of the addresses of trunk ports and agents at each respective entry level, contains an indication of the number of respective agents and the number of respective callers waiting for that group of agents, at any respective entry level. It can then determine in real time, as is well known in the art, the number of callers and agents at a respective entry level and compare that to the IQ or load factor for that one respective entry level. As will be described further, where that IQ factor is exceeded, the caller can then be passed to another entry level in the pattern's entry level series by changing the address for that caller's port to the grouping of extension ports representing the next group of agents at the next entry level in the series of entry levels (entry level series). Further, as will be seen by those skilled in the art, the time of connection of a port to an entry level can be timed and any caller exceeding a predetermined time can be moved along in a series of entry levels to the next group of agents at a next entry level in the series. In a similar manner, the entry level designated for any agents port, whether active or inactive, may be changed to move that agent to the agent group associated with a different entry level or pattern.

In a similar fashion, the Message Announcement System (MAS) source is connected through the time scan multiplex system, as shown in the preferred embodiment to the caller's port providing the announcement at a regular period regardless of the association of the callers port to a particular group of agents at a respective entry point. The two way transmission from and to the caller's port can be accomplished by a hybrid or other similar network and is not discussed herein, as it would be known to those skilled in the art.

The CDS, according to the principles of the invention may operate interactively with caller and agent data and control information. The CDS uses an Intelligent Queue Factor (IQ Factor) or load factor to provide an improved distribution of callers to the ACD agent groups and a more optimum level of service. The effect of the IQ factor is to alter the distribution of callers to agents in response to the call load or active agent changes or control command changes placed into the CDS. These changes are designed to increase the probability a call will be answered responsive to the caller load at any one time.

The IQ factor expressed as a ratio of calls at any one entry level in the CDS to the number of agent groups available at a respective level. As will be seen from the description in the preferred embodiment, the CDS is arranged in a series of entry levels. Each entry level is represented by a respective grouping of caller ports which may be trunk ports or extension ports, for example, representing callers and respective ports representing agents. Each level may have a separate IQ factor with each particular IQ factor representing a different expected response time, and with the caller shifted through each level dependent upon caller loading or the time the caller is in the queue at any one entry level. The progression of the series of entry levels can be arranged in an order of increasing probability a call at respective levels will be answered by arranging the IQ Factor at each level accordingly. For example, the IQ Factor can be made to decrease in the Entry Level Series progression order, increasing the probability a caller will be assigned an agent as the caller is shifted through the CDS Entry Level Series.

As will be seen from the preferred embodiment, other arrangements could be made for use with the invention without departing from the inventive principals. The IQ Factor, expressed as a ratio of calls on hold to available agents could also be made responsive to elapsed time in the queue.

An example of how a caller would be processed though the CDS entry levels is shown in the flow chart of FIG. 1.

A call entering the CDS is placed in entry level 1 of the CDS. In accordance with the principles of the invention an example is shown with three (3) entry levels and with the IQ at each progressive entry level in the series set at lower threshold levels indicative of increasing probability of connecting a caller to an agent. In the preferred embodiment, entry level 1 represents a predetermined IQ factor, in this case shown as 7/2 and its agent group. As the number of calls in the queue at entry level 1 increases, reaching and exceeding the IQ Factor of 7/2, the oldest call in the queue, may then be passed to entry level 2 and its agent group. In a similar manner to entry level 1, entry level 2 is established with a designated number of agents and with a designated IQ Factor. As will be understood by those skilled in the art, entry level 2, designed to handle calls which overflow in the queue from entry level may have a smaller IQ Factor such as 5/2 with a shorter expected response time and a higher probability that a call in entry level 2 will be answered, compared to entry level 1.

As can be seen in the flow chart of FIG. 1, should the call load still be such that the number of callers relative to the number of agents and the IQ factor causes an over flow, the oldest calls, for example, at entry level 2 will then be passed to entry level 3, having a still smaller IQ factor, 3/2 for example.

As will be understood by those skilled in the art IQ Factor or, the number of agents at any entry level can be altered while the CDS is in use and in response to the length of time and the number of callers at each entry level.

The system used with this invention is a Harris 20-20 call processor, which uses, as a processing unit an Intel 80286 CPU.

Figure 2:
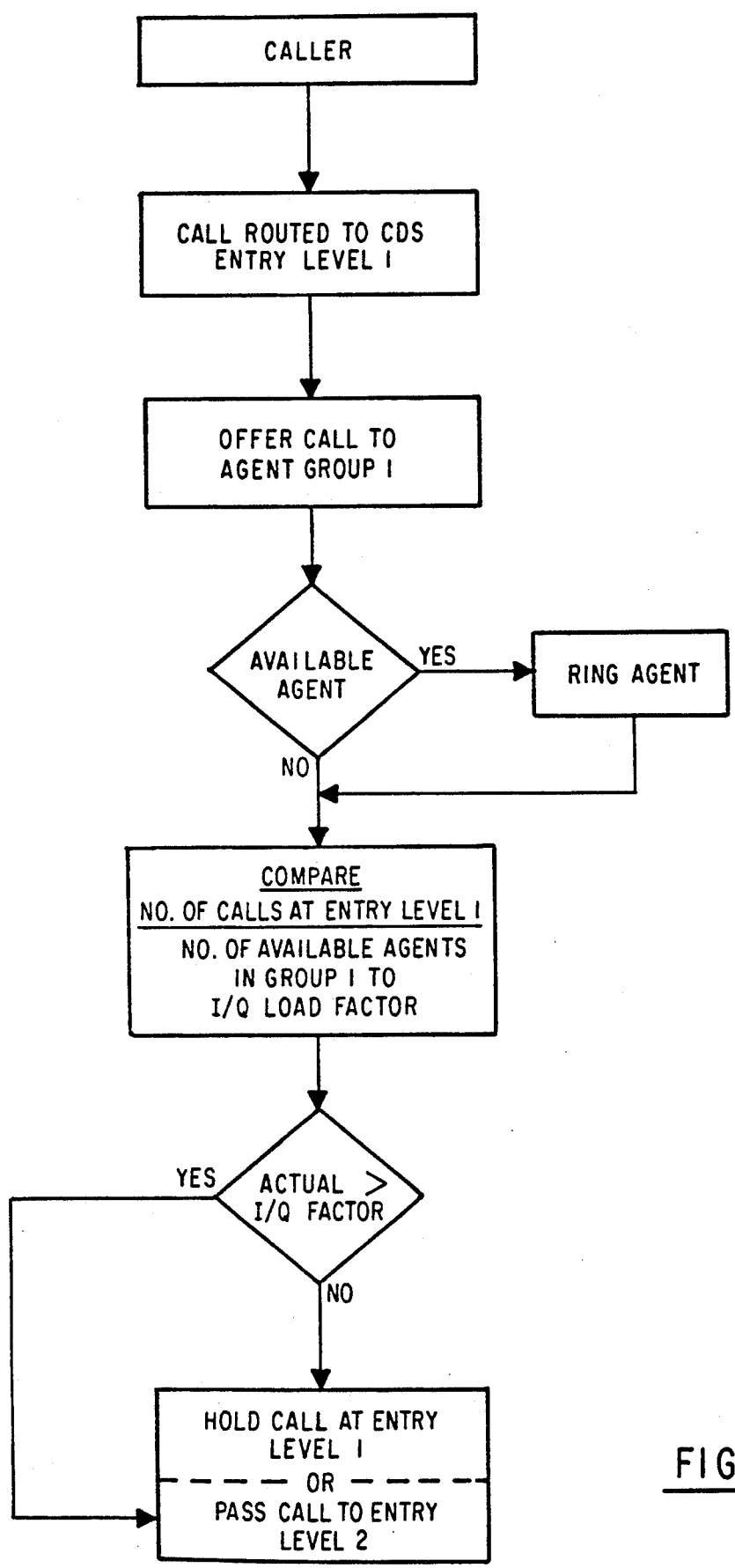
FIG. 2 shows a flow chart of the decision process according to the inventive principals whereby the number of callers and number of agents at any one entry level in the ACD/CDS pattern, is tested relative to the IQ factor at that respective entry level and the caller process through the patterns entry levels in response to that test.

FIG. 2 is a flow chart showing the decision process for producing the results shown in FIG. 1. As can be seen, a call is routed to the CDS at entry level 1, for example, where an agent is available, then the agent is accessed and the call exits the loop. If an agent is not available, the call is kept in the loop and the call status is tested using the IQ factor. If this is done globally by testing the number of calls in the queue at entry level 1 relative to the IQ Factor assigned to entry level 1. Where that IQ factor is exceeded, then the oldest call in the queue at that entry level is transferred to the next entry level in the series of entry levels, increasing the probability the call will be answered.

Figure 3:
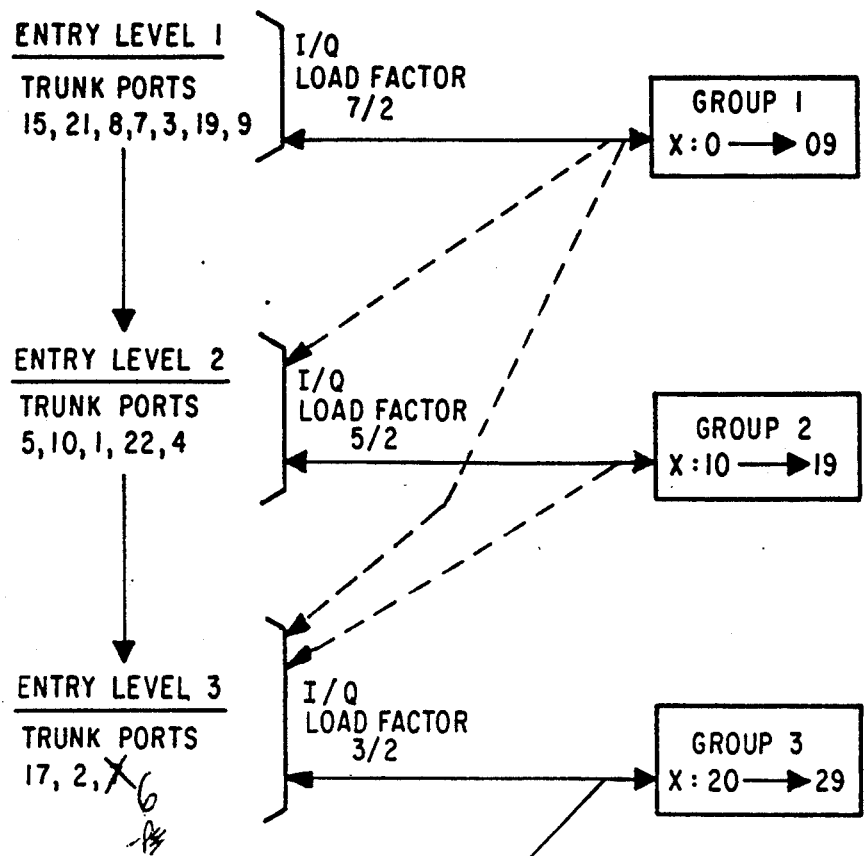
FIG. 3 shows, in schematic form, a plurality of patterns with the CDS and the assignment of agent groups to respective entry levels and to different patterns within the CDS.

The manner of operation of the invention is shown with regard to the example of FIG. 3 and the grouping of caller trunk ports and agents for separate patterns A and B at any one moment in the operation of the system. For example, two patterns are shown CDS pattern A and CDS pattern B. Within CDS pattern A, three entry levels are shown with trunk ports 15, 21, 8, 7, 3, 19, and 9 being assigned to entry level 1 and agent group 1 having agent extensions 0-09 actively assigned to entry level 1. Further as shown, entry level 2 has assigned to it callers at trunk ports 5, 10, 1, 22, and 4. According to the preferred embodiment, each of the caller ports at entry level 2 will have first been assigned to entry level 1 and then passed to entry level 2 when the IQ Factor of 7/2 has been exceeded at entry level 1. Further as shown, according to this example, agent group 3 comprising agents 20 through 29 is assigned to entry level 3. As will be well understood by those skilled in the art, the agent groups can be assigned to one entry level within a pattern and be made accessible to callers at different entry levels in the same pattern or in different patterns. For example, agent group 1 primarily is assigned to entry level 1 in pattern 1 and secondarily may be assigned callers at entry level 2. In FIG. 3, the solid lines connecting agent groups and entry levels is indicative of primary assignments and the solid lines, of secondary assignments. These primary and secondary assignments may also be made with respect to the entry level priority assigned to each agent group. This order of assignment and priority given to the agent group with respect to entry levels and respective callers can be expanded and varied. For example, agent group 2 is shown primarily assigned to entry level 2 in pattern A and secondarily assigned to entry level 3. Further, as shown in FIG. 3, entry level 3 contains trunk port 17, 2, and 6, these callers at these trunk ports having been passed from entry level 1 to entry level 2 and then to entry level 3 according to the operation of the preferred embodiment when the load factor or IQ Factor or time at entry level 1 and entry level 2 has been exceeded. Further agent group 3 comprising agents 20-29 are assigned to entry level 3 in pattern A and entry level 1 in pattern B. In a similar manner, the agent groups in CDS pattern B can be cross assigned to entry levels within the same respective CDS pattern and at the same time assigned to other entry levels in other CDS patterns with separate respective priorities for responding to callers at each entry level.

Figure 4:
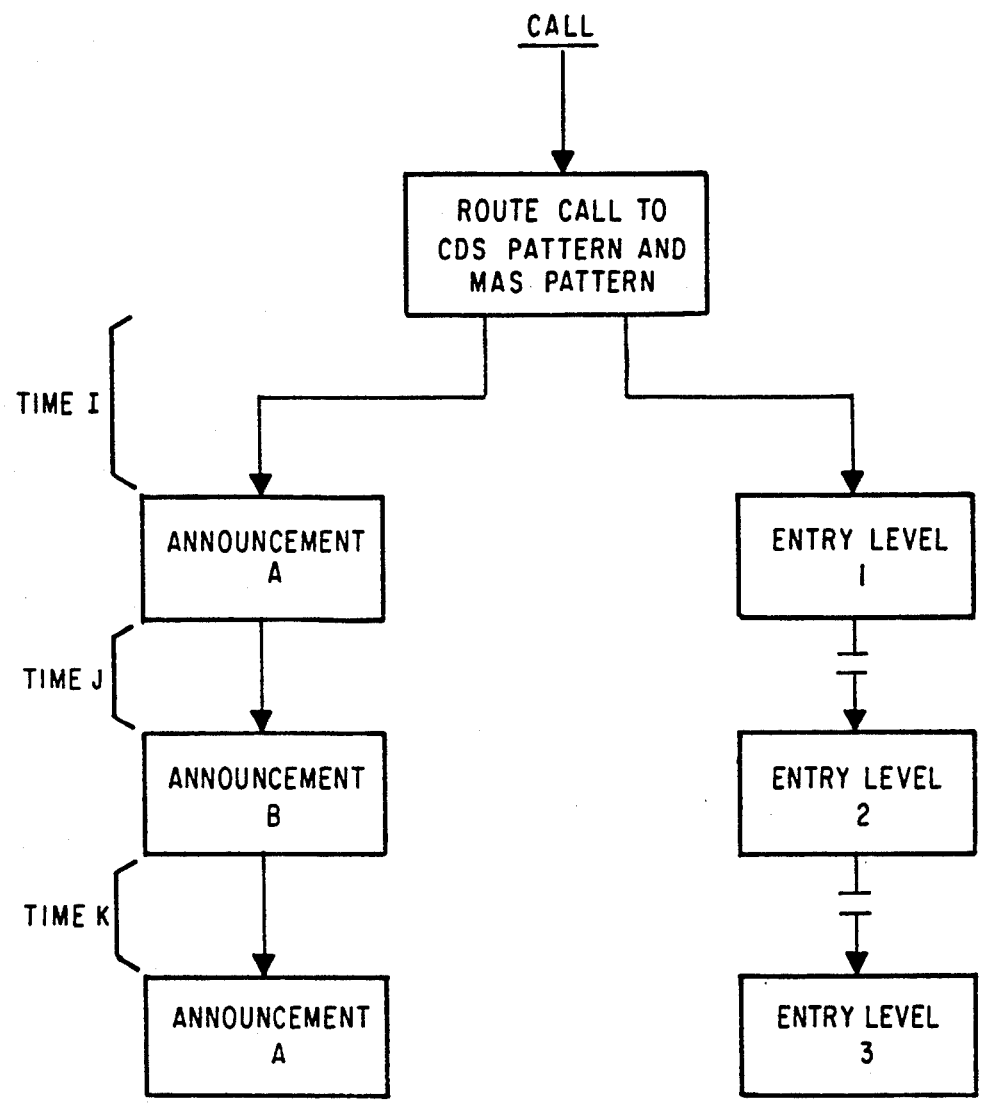
FIG. 4 shows the message announcement system operating in parallel with the CDS and independently of the caller's position and entry level in the CDS.

Another feature of the invention, as shown in FIG. 4, is a message announcement system for providing messages at selected intervals to each caller. The message announcement system operating independently and in parallel with the CDS is shown in FIG. 4. As can be seen, an MAS pattern is established for each caller. That pattern is retained for each caller insuring consistency in the period of the announcements made to each caller as that caller is shifted though the hierarchy of the CDS. The MAS is a feature of the Harris 20-20 call processor, which utilizes an Intel 80286 processor. The period of the message may also be varied relative to the load factor at an entry level or the number of callers or agents available at an entry level. The means and method for so varying the message period will depend of the system used and will be apparent to one skilled in the art. For example, as the caller is passed to successive entry levels, the periods of announcement, shown as Times "I" "J" and "K", may be varied producing a more frequent announcement or the substance of the announcement may be varied. In this way, the period of the announcement or the announcement content may be varied independently of the callers status, that is the callers entry level position, or change in entry level or any fact related thereto.

The invention, according to the preferred embodiment, may be used within any PBX and in its preferred embodiment, is used within the PBX shown within U.S. Pat. No. 4,688,212 "Centralized Image Responsive Telephone Time Slot Interchange System". However, as will be recognized by those skilled in the art, the invention should not be thought of as limited to any particular PBX whether a time slot interchange system, or any other telephone system whether multiplexed or otherwise. The inventive method and apparatus, as used in its preferred embodiment, uses groupings of memory locations to establish entry levels. These memory locations contain the identification of a trunk port in to which a caller is connected and a selected group of address ports for a respective group of agents for a specific entry point. The caller is then moved from entry level to entry level through the system CDS and the series of entry levels by moving the memory locations identifying the callers trunk port location to the next group of memory locations associated with the next entry level. Additionally, where periodic announcements are made to the caller, the periods may be varied and the messages changed separately from the status of the caller in the CDS and to the location of, or to any change in, the callers entry level or changes in entry position. For example, the period of announcement may be held constant or varied as the callers entry level changes or the content or substance of the announcement may change. In this way, the announcements could be made at the same time or more frequently as entry levels change or the announcements could be the same or changed to advise the caller of the call status.

The programs described herein are written in PL/M language for the ACD and in the MAS are as shown below.

We claim:

1. A method of queuing callers connected to an automatic call distribution system (ACD). comprising the steps of:
   a. establishing a queue for the callers;
   b. establishing groups of agents, each of said groups having one or more agents for responding to the said callers;
   c. establishing a series of entry levels;
   d. establishing a load factor for each of said entry levels related to the respective number of callers, with each of said entry levels arranged in a hierarchy of increasing priority levels, and with said increasing priority levels being indicative of an increased probability an agent will respond to the caller in said queue; and
   e. determining whether the said load factor has been exceeded at any of said entry points;
   f. moving at least one caller from said entry level where said load factor has been exceeded to the next in said series of entry levels.

2. A method of controlling the waiting period experienced by a caller in a call distribution system queue, comprising the steps of:
   a. establishing a series of entry levels in said queue;
   b. placing the said caller in said queue at a selected one of said entry levels;
   c. establishing groups of one or more agents for said entry levels;
   d. establishing a load factor at said entry levels indicative of the probability a caller at a respective entry level will be connected to a respective agent;
   e. determining whether the said load factor at respective entry levels have been exceeded and in response to such load factor being exceeded, passing said one or more callers at said respective entry level to another entry level in said series of entry levels.

3. The method of claim 2 wherein:
   f. step d. includes the step of relating said load factor to the number of callers in said queue and the number of agents.

4. The method of claim 3 wherein:
   g. said step d. includes the step of arranging said load factor as the ratio of the number of callers in said queue at respective entry levels to the number of agents at said respective entry levels.

5. The method of claim 4 wherein said step e. includes the step h. of determining the number of agents at each said respective entry level that are active and said step e. of determining whether said load factor has been exceeded includes the step i. of comparing the number of said callers at the said respective entry level with the number of active agents.

6. The method of claim 2 wherein said step e. includes the step j. of passing the first in caller to said next entry level.

7. The method of claim 2 wherein said step e. includes the step k. of assessing the number of callers or the number of active agents at respective entry levels and adjusting the number of agents or the load factor at said respective entry points to decrease the period required to connect a caller to an agent.

8. The method of claim 2 wherein said step e. includes the step l. of moving a caller to the next entry level in said series when said respective caller's time period at said respective entry point has exceeded a set time.

9. The method of claim 2 wherein said step e. includes the step m. of passing said callers to another entry level having a higher probability the said callers will be connected to an agent.

10. The method of claim 2 including the steps of:
    n. connecting said caller to a periodic announcement having a defined timed interval, while said caller is in said queue and waiting to be connected to one of said agents; and
    o. said caller being connected to said announcement, with said defined timed interval being applied to said caller as said caller is being moved from said one entry level to the next entry point is said series of entry levels.

11. The method of claim 10 wherein said step o. includes the step p. of changing the period of said announcement separately of the change of entry level for said caller.

12. The method of claim 2 wherein said step c. includes the step q. of defining the priorities for each said agent group to respond to calls at respective entry levels.

13. The method of claim 10 wherein said caller hears the announcement within the said same defined time intervals when said caller is moved from said one entry level to said next entry level.

14. The method of claim 10 including the step of varying the period of said announcements to a caller relative to the probability of an agent responding to said caller at a respective entry level in the said queue.

15. The method of claim 7 including the step of establishing a plurality of patterns with each pattern having respective agents and said step of adjusting the number of agents includes the step of adding agents from one of said patterns to another of said patterns.

16. A system for controlling the waiting period experienced by a caller in a call distribution system queue, comprising:
    a. means for establishing a series of entry levels in said queue;
    b. means for placing the said caller in said queue at a selected one of said entry levels;
    c. means for establishing groups of one or more agents for said entry levels;
    d. means for establishing load factors at said entry levels indicative of the probability a caller at a respective entry level will be connected to a respective agent;
    e. means for determining whether a said load factor at respective entry levels has been exceeded and in response to such load factor being exceeded, passing said one or more callers at said respective entry level to another entry level in said series of entry levels.

17. The system of claim 16 wherein means e. includes means f. for relating said load factor to the number of callers in said queue and the number of agents, at said respective entry levels.

18. The system of claim 17 wherein said means f. includes means g. for arranging said load factor as the ratio of the number of callers in said queue at respective entry levels to the number of agents at said respective entry levels.

19. The system of claim 18 wherein said means e. includes means h. for determining the number of agents at each said respective entry level that are active and said means e. for determining whether said load factor has been exceeded includes means for comparing the number of said callers at the said respective entry level with the number of active agents.

20. The system of claim 16 wherein said means e. includes means i. for passing the first in caller to said next entry level.

21. The system of claim 16 including means j. for assessing the number of callers or the number of inactive agents at respective entry levels and adjusting the number of agents or the load factor at said respective entry points to decrease the period required to connect a caller to an agent.

22. The system of claim 16 including means k. for moving a caller to the next entry level in said series when said respective caller's time period at said respective entry point has exceeded a set time.

23. The system of claim 16 including means 1. for passing said callers to another entry level having a higher probability the said callers will be connected to an agent.

24. The system of claim 16 including means m. for connecting said caller to a periodic announcement having a defined timed interval, while said caller is in said queue and waiting to be connected to one of said agents with said defined timed interval being separately applied to said caller as said caller is being moved from said one entry level to the next entry point in said series of entry levels.

25. The system of claim 24 wherein said means m. causes the said caller to hear the said announcement within the said same intervals when said caller is moved from said one entry level to said next entry level.

26. The system of claim 24 including means for varying the period of said announcement to a caller relative to the probability of an agent responding to said caller at a respective position in the said queue.

27. The system of claim 16 wherein said call distribution system includes a plurality of patterns with each pattern having respective agents and said step of adjusting the number of agents includes the step of adding agents from one of said patterns to another of said patterns.

28. The system of claim 24 wherein said means for connecting, includes means for changing the period of said announcement separately from the change of entry level for said caller.

29. The system of claim 16 wherein said means for establishing groups of one or more agents includes means for defining the priorities for each said agent group to respond to calls at respective entry levels.

30. The system of claim 24 wherein said means for connecting the caller to a periodic announcement includes means for varying the period of said announcements relative to the probability of an agent responding to a caller at a respective entry level in the said queue.

31. A method of controlling the waiting period experienced by callers in a call distribution system queue, comprising the steps of:
A. establishing a series of entry levels in said queue;
B. placing said callers in said queue at one or more of said entry levels;
C. establishing groups of one or more agents for said entry levels;
D. making said agent groups accessible to said callers at respective different entry levels;
E. establishing load factors for at said entry levels, related to the number X of said callers and indicative of the probability a caller at a respective entry level will be connected to a respective agent group; and
F. determining whether the said load factor at a respective entry level has been exceeded and in response to such load factor being exceeded, passing said one or more callers at said respective entry level to another in said series of entry levels.

32. The method of claim 31 including the step of establishing a plurality of patterns and assigning said groups of agents to one or more of said patterns.

33. The method of claim 32 wherein the step of assigning said groups of agents to said patterns includes the step of assigning said groups of agents primarily to a first said pattern and secondarily to a second said pattern.

34. The method of claim 32 where the said step of assigning includes the step of assigning said agents to entry-levels in the same pattern, or in different patterns.

35. A system for controlling the waiting period experienced by a caller in a call distribution system queue, comprising:
A. means for establishing a series of entry levels in said queue;
B. means for placing said caller in said queue at a selected one of said entry levels;
C. means for establishing groups of one or more agents for said entry levels;
D. means for making at least of said agent groups accessible to callers at different entry levels;
E. means for establishing a load factor at said entry levels indicative the number of callers and of the probability a caller at a respective entry level will be connected to a respective agent; and
F. means for determining whether the said load factor at respective entry level has been exceeded and in response to such load factor being exceeded passing said one or more callers at said respective entry level to another of said entry levels.

36. The apparatus of claim 35 including means for establishing a plurality of patterns and assigning said groups of agents to one or more of said patterns.

37. The apparatus of claim 36 wherein the means for establishing said groups of agents and assigning said groups of agents to said patterns includes assigning said groups of agents primarily to a first said entry level or a first said pattern and secondarily assigning said agents to a second said entry level, or a second said pattern.

38. The apparatus of claim 37 where the said means for establishing includes means for assigning said agents to entry-levels in the same pattern, or in a different pattern.

39. A recording media having a record of signals arranged for use with a computer processing unit and for enabling said computer processing unit to control the waiting period experienced by a caller in a call distribution system queue by:

A. establishing a series of entry levels in said queue;
B. placing said caller in said queue at a selected one of said entry levels;
C. establishing groups of one or more agents for said entry levels;
D. establishing a load factor at said entry levels indicative of the number of callers and the probability a caller at a respective entry level will be connected to a respective agent; and
F. determining whether the said load factor at a said respective entry levels has been exceeded and in response to such load factor being exceeded, passing said one or more callers at said respective entry level to another of entry levels.

* * * * *